US008918767B2

(12) United States Patent
Toub et al.

(10) Patent No.: US 8,918,767 B2
(45) Date of Patent: Dec. 23, 2014

(54) PATTERN-BASED COMPILATION OF ASYNCHRONOUS CONSUMPTION

(75) Inventors: Stephen Harris Toub, Seattle, WA (US); Mads Torgersen, Issaquah, WA (US); Lucian Jules Wischik, Seattle, WA (US); Anders Hejlsberg, Seattle, WA (US); Niklas Gustafsson, Redmond, WA (US); Dmitry Lomov, Redmond, WA (US); Matthew J. Warren, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 562 days.

(21) Appl. No.: 13/162,288

(22) Filed: Jun. 16, 2011

(65) Prior Publication Data

US 2012/0324431 A1    Dec. 20, 2012

(51) Int. Cl.
  *G06F 9/45*    (2006.01)
  *G06F 9/44*    (2006.01)

(52) U.S. Cl.
  CPC ..................................... *G06F 8/456* (2013.01)
  USPC ........... 717/140; 717/114; 717/116; 717/106; 717/108

(58) Field of Classification Search
  None
  See application file for complete search history.

(56) References Cited

U.S. PATENT DOCUMENTS

| | | | |
|---|---|---|---|
| 5,748,963 A | 5/1998 | Orr | |
| 5,815,653 A | 9/1998 | You et al. | |
| 6,353,923 B1 | 3/2002 | Bogle et al. | |
| 6,412,106 B1 | 6/2002 | Leask et al. | |
| 7,401,323 B2 | 7/2008 | Stall et al. | |
| 7,634,759 B2 | 12/2009 | Calsyn et al. | |
| 7,836,430 B2 | 11/2010 | Shebs | |
| 8,019,075 B2 | 9/2011 | Mohammad et al. | |
| 8,079,019 B2 | 12/2011 | Lindo et al. | |
| 8,127,277 B2 | 2/2012 | Albot et al. | |
| 8,539,452 B2 | 9/2013 | Chapman et al. | |
| 2004/0168155 A1 | 8/2004 | O'Farrell et al. | |
| 2004/0205720 A1 | 10/2004 | Hundt | |
| 2005/0034024 A1 | 2/2005 | Alverson et al. | |
| 2006/0248512 A1 | 11/2006 | Messmer et al. | |
| 2006/0248514 A1 | 11/2006 | Messmer et al. | |
| 2007/0074166 A1 | 3/2007 | Overturf et al. | |
| 2007/0220490 A1 | 9/2007 | Kobayashi et al. | |

(Continued)

OTHER PUBLICATIONS

Toub, "Processing Sequences of Asynchronous Operations with Tasks", Nov. 21, 2010, 6 pages.

(Continued)

*Primary Examiner* — Qamrun Nahar
(74) *Attorney, Agent, or Firm* — Kevin Sullivan; Kate Drakos; Micky Minhas (57) ABSTRACT

The present invention extends to methods, systems, and computer program products for transforming source code to await execution of asynchronous operations. Embodiments of the invention simplify authoring and use of asynchronous methods, by generating statements that use well-defined awaitable objects to await completion of asynchronous operations. For example, a computer system can transform a statement that requests to await the completion of an asynchronous operation into a plurality of statements that use a predefined pattern of members of an awaitable object corresponding the asynchronous operation. The pattern can include one or more members configured to return a completion status of the asynchronous operation, one or more members configured to resume execution of the asynchronous method at a resumption point when the asynchronous operation completes, and one or more members configured to retrieve completion results. Accordingly, the plurality of statements can use these members to await execution of the asynchronous operation.

20 Claims, 2 Drawing Sheets

(56) References Cited

U.S. PATENT DOCUMENTS

| | | | |
|---|---|---|---|
| 2008/0052683 | A1 | 2/2008 | Bates et al. |
| 2009/0125890 | A1 | 5/2009 | Bennet et al. |
| 2009/0133033 | A1 | 5/2009 | Lindo et al. |
| 2009/0307652 | A1 | 12/2009 | Maybee et al. |
| 2010/0131745 | A1 | 5/2010 | Meijer et al. |
| 2010/0153927 | A1 | 6/2010 | Stall et al. |
| 2010/0313184 | A1* | 12/2010 | Gustafsson et al. ........ 717/116 |
| 2011/0209125 | A1 | 8/2011 | Stone |
| 2011/0302454 | A1 | 12/2011 | Prophete et al. |
| 2012/0047495 | A1 | 2/2012 | Meijer et al. |
| 2012/0151452 | A1 | 6/2012 | Zinkovsky et al. |
| 2012/0246624 | A1 | 9/2012 | Halliday et al. |
| 2012/0266144 | A1 | 10/2012 | Halliday et al. |
| 2013/0275950 | A1 | 10/2013 | Dalcher |

OTHER PUBLICATIONS

Lippert, Eric, "Asynchronous Programming in C# 5.0 Part Two: Whence Await?", Oct. 29, 2010, 5 pages.
Moise, Wesner, Smart Software, "Building Iterators Using Asynchronous Methods", Nov. 2, 2010, 4 pages.
Sur, Abhishek, "C# 5.0 vNext-New Asynchronous Pattern", Nov. 20, 2010, 25 pages.
Juday, Jeffrey, "Awaiting Future C# Asynchronous Features Brought to You by .NET Parallel Computing", Dec. 7, 2010, 6 pages.
Toub, "Implementing the Asynchronous Programming Model With Future <T>", Feb. 29, 2008, 4 pages.
Matveev, Vladimir, "Event-Based Async Pattern in F#", 2010, 3 pages.
Krohn, Maxwell, et al., "Events Can Make Sense", Based on information and belief available, at least as early as Dec. 29, 2010, 14 pages.
Halliday, ""What changes in debugging Async code?"" Microsoft Visual Studio Blog, Last Reply Nov. 15, 2010, 5 pages.
Rossi, ABAP Debugger, SAP Community Network Blog, Last Edited May 28, 2010, 2 pages.
Vijayvargiya, "Writing Windows Debugger—Part 2," The Code Project, Last Updated Dec. 26, 2010, 34 pages.
Allen, "Visual Studio Debugging Tutorial," Dot Net Perls, Last Post Dec. 8, 2010, 8 pages.
"Visual Studio 2010: Understanding Debugging," Programming 4Us, Oct. 13, 2010, 9 pages.
Fernadez, et al., "Ddbx-LPP: A Dynamic Software Tool for Debugging Asynchronous Distributed Algorithms on Loosely—Coupled Parallel Processors", Retrieved at<< http://ieeexplore.ieee.org/stamp/stamp.jsp?arnumber=00169757>>,1991, pp. 639-644.
Mitrovic, Vladimir, "Testing Asynchronous Code With GHUnit", Retrieved at<< http://vladimir.zardina.org/2010/11/testing-asynchronous-code-with-ghunit/>>, Nov. 20, 2010, pp. 4.
Satyam, "Ask Satyam: Writing Clean, Debuggable Code", Retrieved at <<http://www.yuiblog.com/blog/2010/09/02/ask-satyam-writing-clean-code/>>, Sep. 2, 2010, pp. 14.
Baechtel, Don, "What changes in debugging Async code", Retrieved at<< http://social.msdn.microsoft.com/Forums/en-US/async/thread/9d6508a5-bd0f-40df-93a3-49ddd69e5a39/>>, Nov. 2010, pp. 5.
Griffiths, Ian, "C# 5 Async Exception Handling", Retrieved at<<http://www.interact-sw.co.uk/iangblog/2010/11/01/csharp5-async-exceptions>>, Nov. 1, 2010, pp. 5.
Office Action, U.S. Appl. No. 13/053,228, filed Mar. 22, 2011, Notification Date: Jan. 31, 2013, 30 pages.
Office Action, U.S. Appl. No. 13/053,228, filed Mar. 22, 2011, Notification Date: Jun. 26, 2013, 28 pages.
Office Action, U.S. Appl. No. 13/088,003, filed Apr. 15, 2011, Notification Date: Jul. 5, 2013, 20 pages.
Office Action, U.S. Appl. No. 13/088,003, filed Apr. 15, 2011, Notification Date: Jan. 6, 2014, 31 pages.
Marchetto et al., "State-Based Testing of Ajax Web Applications," 2008, 2008 International Conference on Software Testing, Verification, and Validation, pp. 121-130.
Jhala et al., "Interprocedural analysis of asynchronous programs," Jan. 2007, POPL '07 Proceedings of the 34th annual ACM SIGPLAN-SIGACT symposium on Principles of programming languages, pp. 339-350.
Lei et al., "Efficient Reachability Testing of Asynchronous Message-Passing Programs," 2002, Proceedings of the Eighth IEEE International Conference on Engineering of Complex Computer Systems (ICECCS'02), pp. 1-10.

* cited by examiner

PATTERN-BASED COMPILATION OF ASYNCHRONOUS CONSUMPTION

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Authoring computer applications that perform some computing tasks present unique challenges for programmers. Applications are generally broken down into one or more tasks which execute in a well-defined, sequential program control flow. A problem arises when tasks, which could otherwise be performing other functions, must wait for completion of operations having high latency. For example, an application may implement a task for that generates a user interface. At some point during execution, the user interface task may require information that is not yet available, request the information (e.g., via a method call), and then block while waiting for the information to become available. In this circumstance, the user interface would "freeze" or become unresponsive while the user interface task blocks to wait for the information to become available. For requests that return the information quickly, blocking may not present a serious problem. However, for requests with high levels of latency (e.g., requests that are computationally intensive, or requests for information from other computing systems), blocking can lead to serious performance issues. Not only can blocking make interactive applications unresponsive, blocking can hurt the scalability and performance of any application.

To address the performance penalty incurred by blocking, asynchronous programming techniques have been developed, which allow tasks to continue executing while awaiting the return of asynchronous requests or methods. Asynchronous programming has, however, been challenging when using mainstream programming languages. To achieve asynchrony, developers are forced to write asynchronous methods that respond to requests for "callbacks," requested by a calling context. Developers are furthermore forced to write asynchronous methods that track state of asynchronous operations themselves. As such, authoring asynchronous methods is typically infeasible for all but the most advanced developers.

BRIEF SUMMARY

The present invention extends to methods, systems, and computer program products for transforming source code to await execution of asynchronous operations. In some embodiments, a computing system accesses an asynchronous method from within a portion of computer program source code, and recognizes a statement within the asynchronous method requesting to await the completion of an asynchronous operation. The computer system then transforms the statement into a plurality of other statements, which are configured to use an awaitable object to await completion of the asynchronous operation.

More specifically, the other statements are configured to first use a first member of the awaitable object to determine a completion status of the asynchronous operation. When the completion status indicates that the asynchronous operation has not already completed, the other statements are configured to use a second member of the awaitable object to await completion of the asynchronous operation, and to resume execution of the asynchronous method at a resumption point in the asynchronous method when the asynchronous operation completes. The other statements are also configured to return to a calling context after awaiting completion of the asynchronous operation, to resume execution of the asynchronous method at the resumption point subsequent to completion of the asynchronous operation, and to use a third member of the awaitable object to access a result of the asynchronous operation subsequent to resuming execution of the asynchronous method.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for transforming source code to await execution of asynchronous operations. In some embodiments, a computing system accesses an asynchronous method from within a portion of computer program source code, and recognizes a statement within the asynchronous method requesting to await the completion of an asynchronous operation. The computer system then transforms the statement into a plurality of other statements, which are configured to use an awaitable object to await completion of the asynchronous operation.

More specifically, the other statements are configured to first use a first member of the awaitable object to determine a completion status of the asynchronous operation. When the completion status indicates that the asynchronous operation has not already completed, the other statements are configured to use a second member of the awaitable object to await completion of the asynchronous operation, and to resume execution of the asynchronous method at a resumption point in the asynchronous method when the asynchronous operation completes. The other statements are also configured to return to a calling context after awaiting completion of the asynchronous operation, to resume execution of the asynchronous method at the resumption point subsequent to completion of the asynchronous operation, and to use a third member of the awaitable object to access a result of the asynchronous operation subsequent to resuming execution of the asynchronous method.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
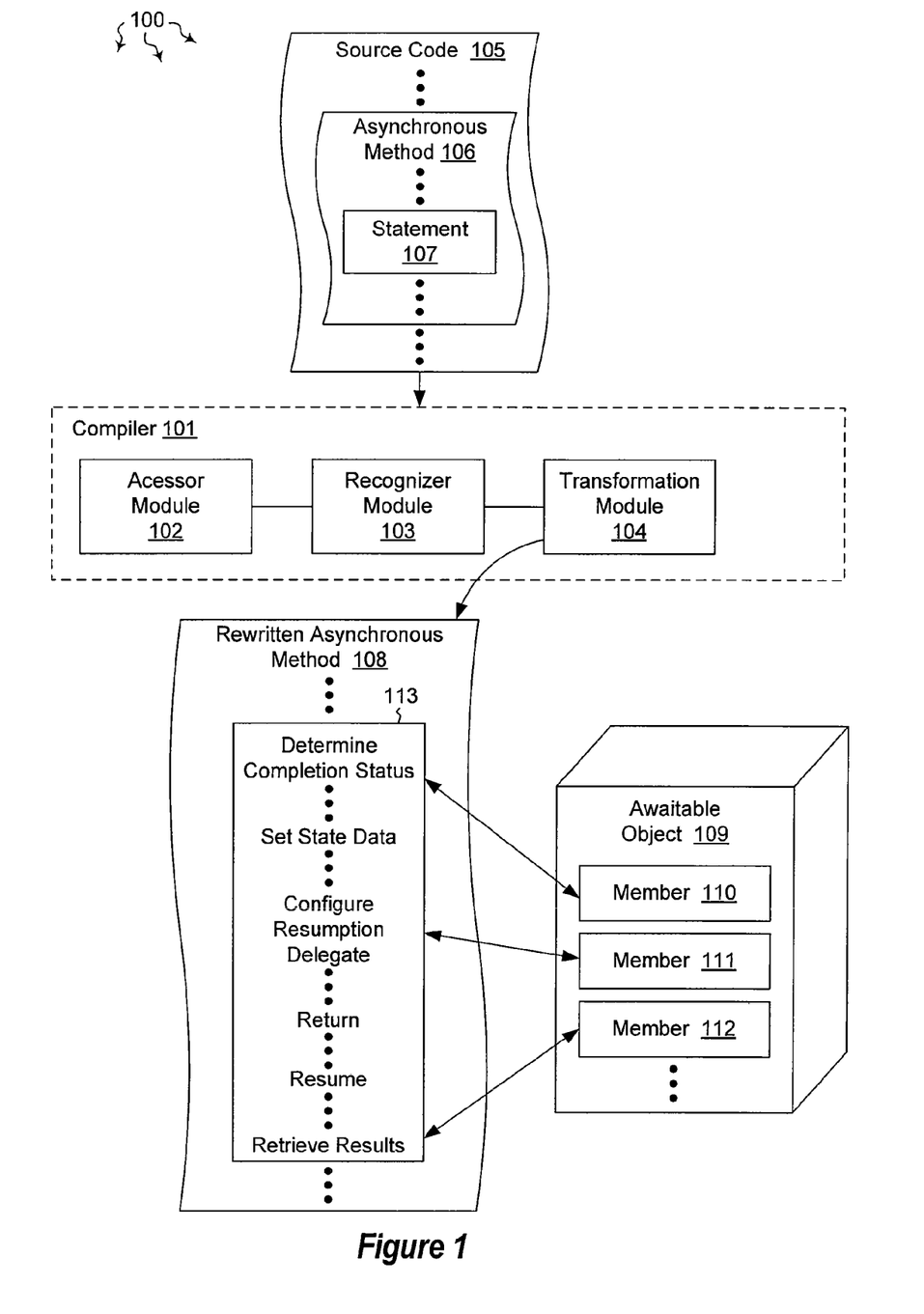
FIG. 1 illustrates an example computer architecture that facilitates transforming source code to await execution of asynchronous operations.

FIG. 1 illustrates an example computer architecture 100 that facilitates transforming source code to await execution of asynchronous operations. Referring to FIG. 1, computer architecture 100 includes compiler 101. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Compiler 101 is configured to process source code (e.g., source code 105) to represent and support execution of various programming elements. More particularly, compiler 101 is configured to support the compilation of asynchronous methods (e.g., asynchronous method 106) that are configured to await the execution of one or more asynchronous operations. Asynchronous operations may be executed in connection with an awaitable object (e.g., awaitable object 109) that exposes a predescribed pattern (e.g., one or more members 110-112 for interacting with the awaitable object and/or the asynchronous operation(s)) and that manages execution of the asynchronous operations (e.g., as part of a state machine). Authors of asynchronous methods can thus include one or more statements (e.g., statement 107) that "await" awaitable objects. The compiler 101 can then transform the "await"

statements into one or more other statements that use the predescribed pattern of the awaitable object to await completion of the asynchronous operation(s) and report/propagate results.

Compiler 101 can include hardware and/or software components that transform a source computing language into a destination computing language. For example, compiler 101 can translate "higher-level" source code of a programming language (e.g., C#, VISUAL BASIC, JAVA, JAVASCRIPT, etc.) into "lower-level" instructions (e.g., assembly language/machine code, intermediate language code, etc.). The instructions can then be executed by one or more physical and/or virtual computing systems, by one or more managed runtime environments, etc. The lower-level instructions can also be subject to further processing or translation. Compiler 101 can, in some embodiments, be configured to receive and transform source code for a variety of programming languages into one or more types of lower-level instructions. In other embodiments, compiler 101 can be configured to translate source code of a single programming language into a single type of lower-level instructions.

Compiler 101 can be configured with one or more modules that access and process source code. In some embodiments, the modules can include accessor module 102, recognizer module 103, and transformation module 104. Of course, one will recognize in view of the disclosure herein that compiler 101 is not limited to the specific arrangement of modules described, and can perform the inventive embodiments using other configurations.

Accessor module 102 is configured to receive source code which, from time to time, can include one or more asynchronous methods that call one or more awaitable instances. For example, accessor module can be configured to access asynchronous method 106 from source code 105. Asynchronous method 106 can include statement 107, which awaits an awaitable instance (e.g., awaitable object 109) that executes one or more asynchronous operations, and which exposes a predescribed pattern (e.g., members 110-112).

Recognizer module 103 is configured to receive asynchronous methods from accessor module 102 and to recognize statements within the methods that request to await the completion of asynchronous operations through instances (e.g., awaitable objects) that expose the predescribed pattern. For example, recognizer module can be configured to identify statement 107 through the use of an express keyword, such as 'await'. Statement 107 may therefore include syntax similar to 'await t', where 't' is an awaitable object, or an instance thereof (e.g., a clock object). Recognizer module 103 can accordingly recognize that the asynchronous method 106 containing the statement 107 requests to use a predescribed pattern exposed by 't' to await completion of asynchronous operations of 't'. When 't' represents a clock object, for example, 't' can be "awaited on" until an asynchronous operation of the clock object completes (e.g., until "the clock strikes noon"). Of course, the 'await' keyword is exemplary only, and use of virtually any keyword is possible. In some embodiments, no express keyword is used, and the statement 107 is recognized implicitly based on context of the statement 107 within surrounding code.

Transformation module 104 is configured to receive statement 107 from recognizer module 103 and to transform statement 107 into one or more other statements that are configured to cause the asynchronous method 106 use the awaitable object 109 to await asynchronous operation(s). Transformation module 104 typically generates a plurality of statements 113 that use the predefined pattern (e.g., a well-defined set of members, such as methods) exposed by awaitable objects.

Awaitable objects (e.g., awaitable object 109) can be awaitable, at least in part, by virtue of exposing the predefined pattern and by managing execution of asynchronous operations (as part of a state machine, for example). In one or more embodiments, the pattern can define a plurality of members (e.g., methods) 110, 111, and 112 for awaitable objects to expose. It will be appreciated in view of this disclosure that the particular number of members and their corresponding function can be modified without departing from the scope of the invention.

Transformation module 104 can be configured to generate first statements 113 that are, in turn, configured to use member 110 to determine a completion status of the asynchronous operation(s). Member 110 can comprise a first method (e.g., 'IsCompleted') of the awaitable object 109 that is configured to return a completion status of the asynchronous operation(s) associated with the awaitable object. The completion status can comprise, for example, a Boolean value that is TRUE when the asynchronous operation(s) have completed, or that is FALSE when the asynchronous operation(s) have not yet completed. Any other appropriate means for communicating completion status is also possible, however (e.g., string values, integer values, objects, etc.).

It will be appreciated that, even if member 110 is called immediately subsequent to initialization (by the synchronous method or otherwise) of an awaitable object, the asynchronous operation(s) associated with the awaitable object may already be completed before member 110 is called. Therefore, an optimization is achieved by configuring the transformation module 104 to generate the first statements 113 that, prior to setting up any environment or state needed to do the awaiting, use member 110 to determine whether the asynchronous operation(s) need to be awaited. The asynchronous operation(s) may already be completed because there was no work to be done by the operation(s), the operation(s) completed exceptionally, etc. Accordingly, the transformation module 104 can be configured to generate statements (not shown) that retrieve/propagate results of the asynchronous operation(s) (using member 112, for example, as discussed later) if the asynchronous operation(s) have already completed.

Otherwise, if the asynchronous operation(s) are not yet complete, the transformation module 104 can be configured to generate second statements 113 that perform initialization tasks and "pre-await" work, including setting up environment or state that supports suspension and resumption of the asynchronous method 106. For example, the second statements 113 can be configured to set up a resumption point (e.g., a label) in the asynchronous method 106 where execution of the asynchronous method 106 can resume when the asynchronous operation(s) complete and any appropriate "post-await" work can be performed. This resumption point can be associated with a resumption delegate that can be used to identify and resume execution at the resumption point. Initialization and "pre-await" work can include, for example, initialization of a 'resumption' delegate on first use, setting up relevant data structures that enable the later resumption, spilling locals to the heap and then pulling them back onto the stack after resumption, and the like.

After generating second statements 113 configured to perform "pre-await" work, such as establishing and initializing environment or state data, the transformation module 104 can be configured to generate third statements 113 that use member 111 to await completion of the asynchronous operation(s) by configuring a resumption delegate. Member 111 can be a second method (e.g., 'OnCompleted') of the awaitable object 109 configured to set the resumption delegate on the awaitable object 109. Setting the resumption delegate can involve configuring the awaitable object 109 to use the resumption delegate to resume execution of the asynchronous method 107 at the resumption point when the asynchronous operation(s) complete. Member 111 can therefore be configured take as a parameter the resumption delegate, configure the awaitable object 109 and return (e.g., return TRUE when the resumption delegate is set properly).

After successfully using member 111 to set the resumption delegate, the transformation module 104 can be configured to generate fourth statements 113 that cause the asynchronous method 106 to return to a calling context (e.g., to exit asynchronous method 106 and to return to the calling context in source code 105). Thus, while the asynchronous operation(s) complete, the asynchronous method can be suspended and code within source code 105 can be executed concurrently with the asynchronous operation(s).

When the asynchronous operation(s) complete, execution of the asynchronous method 106 can resume at the resumption point where any appropriate "post-await" work is performed and/or results of the asynchronous operation(s) are obtained. For instance, fifth statements 113 can be configured to establish the resumption point (e.g., a label). The transformation module 104 can be configured to generate sixth statements 113 that then use member 112 to retrieve/propagate results of the asynchronous operation(s), as well as any other appropriate statements for performing other "post-await" work. Member 112 can be a third method (e.g., 'GetResult') of the awaitable object 109 configured to return or propagate results of the completion of the asynchronous operation(s). Results can include, for example, result data (when the asynchronous operation(s) complete successfully), exception data (when the asynchronous operation(s) complete exceptionally), and cancellation data such as a stored token indicating the source of a cancellation request (when the asynchronous operation(s) complete due to cancellation).

The results obtained via member 112 can then be returned by the asynchronous method 106 to a calling context, or otherwise propagated by the asynchronous method 106. Through use of the member 112, the awaitable object 109 can be seen as a "future" object that can be used to retrieve the future or eventual results of asynchronous operations. In some embodiments, however, the awaitable object 109 can also be used to obtain intermediary results (in addition to mere completion status).

As indicated above, the particular number and function of the members of the predefined pattern can vary. For example, in one embodiment, there may be only two members. The first member (e.g., BeginAwait), for example, can be configured to combine the functionality of members 110 and 111. For example, the first member can be called with a resumption delegate, much like member 111, but can also report status, much like member 110. If the asynchronous operation(s) have completed, the member can be configured to simply return (e.g., return FALSE). If the asynchronous operations have not completed, the member can be configured to set the resumption (much like member 111) and return (e.g., return TRUE). The second member (e.g., EndAwait) can function substantially similar to member 112, and be usable to retrieve/propagate results of the completion of asynchronous operations. One will appreciate that when using this alternative pattern of members, the statement 113 can set state before calling any members. One will also appreciate that this alternative pattern can also be created by mere use of the three members previously described. For instance, awaitable object 109 can expose the first member, but use the first member to call member 110 and member 110.

While asynchronous object 109 can include instances (e.g., an instance resulting from instantiating an object), it will be appreciated that, in some embodiments and in some programming languages, the indirection of instantiating an object may not be necessary. It will also be appreciated that the embodiments described herein are usable using both static binding and dynamic binding. Furthermore, one will recognize that the embodiments described herein can be applicable to a host of different types of objects and different programming language constructs. Accordingly, awaitable objects can be considered to be composable objects any applicable to virtually any programming language supported construct.

Embodiments described herein thus enable the authoring of asynchronous methods that can simply await awaitable objects that expose a predefined pattern and that manage execution of asynchronous operations. This frees the developer from worrying about details surrounding use of asynchronous operations, letting the compiler 101 and asynchronous objects take care of these details.

Figure 2:
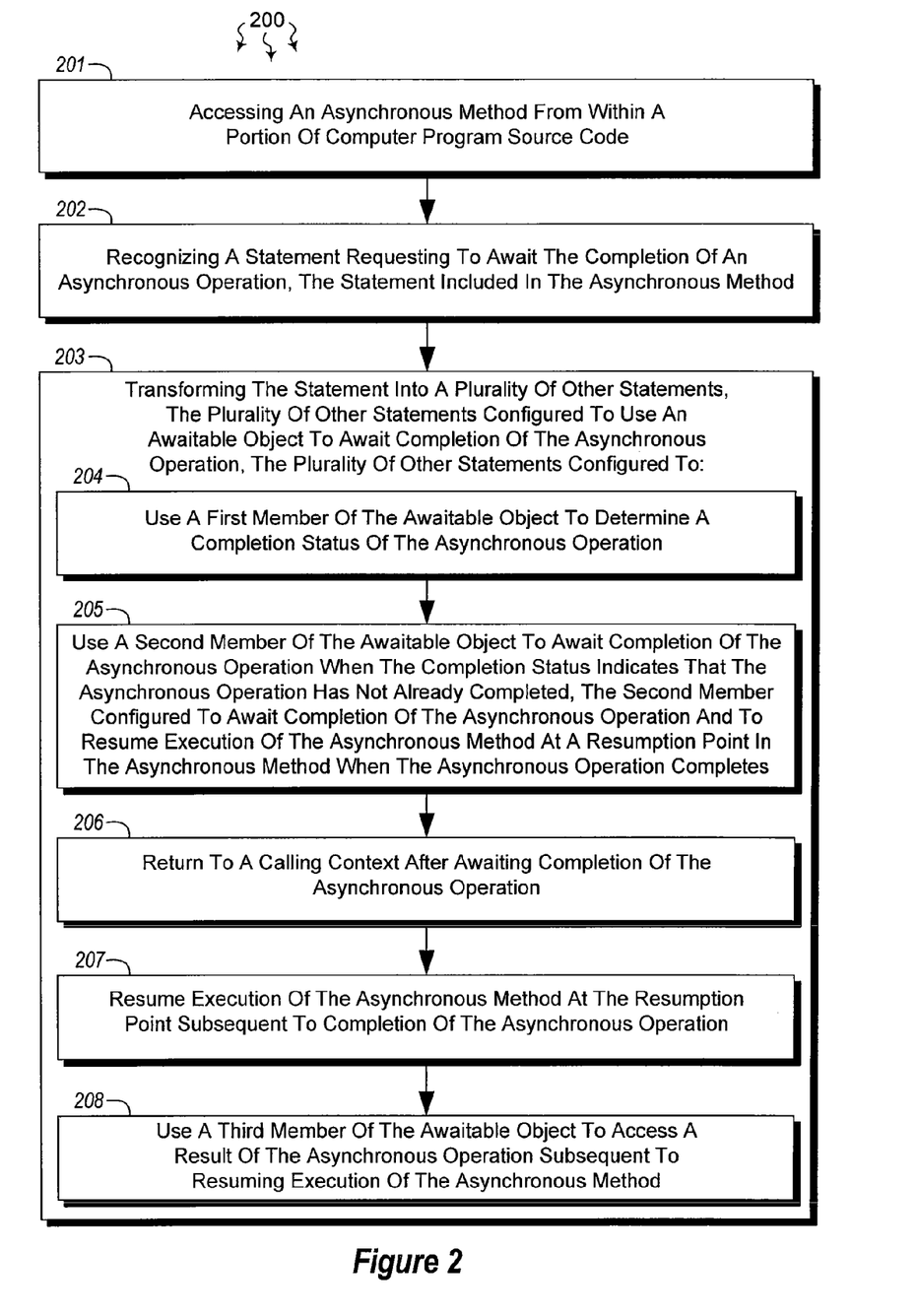
FIG. 2 illustrates a flow chart of an example method for transforming source code to await execution of asynchronous operations.

FIG. 2 illustrates a flow chart of an example method 200 for transforming source code to await execution of asynchronous operations. Method 200 will be described with respect to the components and data of computer architecture 100 depicted in FIG. 1.

Method 200 includes an act of accessing an asynchronous method from within a portion of computer program source code (act 201). For example, accessor module 102 can access at least a portion of source code 105. Source code 105 can include asynchronous method 106, which can in turn include one or more statements 107 that requests to await and awaitable instance (e.g., awaitable object 109). Awaitable object 109 can execute/manage one or more asynchronous operations, and can expose a predefined pattern, either directly or indirectly.

Subsequent to accessing source code, method 200 includes an act of recognizing a statement requesting to await the completion of an asynchronous operation, the statement included in the asynchronous method (act 202). For example, recognizer module 103 can identify/recognize that asynchronous method 106 includes statement 107. Identification can be based on express identifiers (e.g., the keyword 'await') or implicit indicators (e.g., the context of statement 107 within asynchronous method 106).

In response to recognizing the statement, method 200 includes an act of transforming the statement into a plurality of other statements, the plurality of other statements configured to use an awaitable object to await completion of the asynchronous operation (act 203). For example, transformation module 104 can transform the statement 107 into a plurality of statements 113 that use the predefined pattern exposed by awaitable object 109 to await completion of asynchronous operations. The exact form of the statements can vary widely depending on the predefined pattern, as well as other things. The generated statements illustrated in FIG. 2, for example, use a predefined pattern that includes three members. It will be appreciated, however, the embodiments extend to any number of members.

As illustrated, method 200 includes the plurality of other statements being configured to use a first member of the awaitable object to determine a completion status of the asynchronous operation (act 204). For example, transformation module 104 can generate statements that use member 110 of awaitable object 109 to determine a completion status the asynchronous operation(s). When the member 110 indicates that the operation(s) are complete, the statements can use member 112 to retrieve results and to report to a calling context that the asynchronous operation(s) have completed.

Alternatively, when member indicates that the operation(s) are incomplete, the statements can set up any state or environment needed for suspending the asynchronous method 106, such as establishing a resumption point (e.g., a label) in the asynchronous method 106.

Along these lines, method 200 also includes the plurality of other statements being configured to use a second member of the awaitable object to await completion of the asynchronous operation when the completion status indicates that the asynchronous operation has not already completed, the second member configured to await completion of the asynchronous operation and to resume execution of the asynchronous method at a resumption point in the asynchronous method when the asynchronous operation completes (act 205). For example, transformation module 104 can generate statements that use member 111 of awaitable object 109 to set up a resumption delegate, which can resume execution of the asynchronous method 106 at a resumption point (e.g., the label).

Method 200 also includes the plurality of other statements being configured to return to a calling context after awaiting completion of the asynchronous operation (act 206). For example, transformation module 104 can generate statements that return to a calling context of the asynchronous method 106, such as other code in source code 105, for instance. In this way the asynchronous method 106 is suspended while the asynchronous operation(s) being awaited complete. During this time, other code can execute, such that the calling context using the asynchronous method 106 need not block while awaiting completion of the operation(s).

Method 200 also includes the plurality of other statements being configured to resume execution of the asynchronous method at the resumption point subsequent to completion of the asynchronous operation (act 207). For example, transformation module 104 can generate statements that enable asynchronous method 106 to resume execution when the asynchronous operations(s) complete. The statements can include, in some embodiments, the label corresponding to the previously configured resumption point. Thus, then when the asynchronous operation(s) complete, the awaitable object 109 can use the resumption delegate (which was previously used in connection with member 111) to resume execution at the label.

Method 200 also includes the plurality of other statements being configured to use a third member of the awaitable object to access a result of the asynchronous operation subsequent to resuming execution of the asynchronous method (act 208). For example, transformation module 104 can generate statements that use member 112 of awaitable object 109 to retrieve results of the completion of the asynchronous operation(s). Asynchronous operation(s) may complete in various contexts, such as successful completion, exceptional completion, completion due to cancellation, etc. Accordingly, retrieving results can include retrieving result data (for successful completion), exception data (for exceptional completion), cancellation data (for completion due to cancellation), and the like.

The embodiments will now be described in the context of exemplary computer program pseudo code. It will be appreciated that the pseudo code examples provided are for illustrative purposes only, and are in no way limiting to the applicability of the embodiments described herein. Embodiments are extendable to a variety of computer programming languages, far beyond the scope of the foregoing examples.

In some embodiments, asynchronous method 106 may include a statement 107 similar to:
TResult result=await t;
Thus, the statement requests to await an awaitable object 't', the results of which are to be stored in a 'result' of type 'TResult'. Awaitable object 't' can execute/manage one or more asynchronous operations, and can conform to the predefined pattern (i.e., expose members 110-112).

After accessor module 102 and recognizer module 103 access and recognize the statement, transformation module 104 can transform the statement into a plurality of statements similar to:

```
if (t.IsCompleted)
{
    state = Label;
    t.OnCompleted(continuation);
    return;
Label:
}
TResult result = t.GetResult( );
```

The statements first check to see whether the asynchronous operation(s) have already completed using the first member 110 (IsCompleted), and if so, they retrieve results of the operation(s) using the third member 112 (GetResult). Otherwise, the statements set up state, configure the continuation using the second member 111 (OnCompleted), and return (thereby suspending the asynchronous method). Later, when the operation(s) complete, execution resumes at 'Label' and results of operation are retrieved using the third member 112 (GetResult).

While the illustrated pseudo code uses the awaitable object 't' directly, embodiments also include levels of indirection, such as by obtaining an 'awaiter' from 't' and using the 'awaiter'. For instance:
var $awatier=t.GetAwaiter( );
In which case the statements would use 'awaiter' instead of 't':

```
!$awaiter.IsCompleted( );
!$awaiter.OnCompleted(continuation);
!$awaiter.GetResult( );
```

It is noted that the statements can be embodied in other forms as well. For example, the statement 'TResult result=await t;' may alternatively be transformed into a plurality of statements that do additional "pre-await" and "post-await" work, as well as other initialization tasks. For instance:

```
var $awaiter = t.GetAwaiter( );
if (!$awaiter.IsCompleted)
{
    if (IsFirstNotCompletedAwait)
    {
        FirstYieldInitialization( );
    }
    PreAwaitWork( );
    state = Label;
    $awaiter.OnCompleted(MoveNextDelegate);
    PostOnCompletedWork(IsFirstNotCompletedAwait);
    return;
Label:
    PostAwaitWork( );
}
TResult result = $awaiter.GetResult( );
```

Here, the statements (which use a level of indirection through $awaiter) can potentially perform additional initialization tasks using FirstYieldInitialization (e.g., if this is the first time this particular task is being awaited), and also includes statements doing work prior to and after awaiting (e.g., PreAwaitWork and PostAwaitWork). As mentioned, these statements can initialize the resumption delegate (MoveNextDelegate) on first use, set up relevant data structures used to enable the later resumption, spill locals to the heap and then pull them back onto the stack after resumption, etc.

In addition, these statements also include PostOnCompletedWork that is performed after setting the resumption delegate and prior to returning to the calling context. The PostOnCompletedWork gives the compiler an opportunity to do work after the awaitable object has been told it's yielding, which can be work not performed as part of the PreAwaitWork. For example, the PostOnCompletedWork can be used to capture ambient state (e.g., state connected with the OnCompleted call), remove the ambient state prior to the "return" so that the calling context does not see the ambient state, and then make the ambient state available for the GetResult call.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system also including one or more modules for converting source code into executable code, a method for transforming source code to await execution of asynchronous operations, the method comprising:
   an act of accessing an asynchronous method from within a portion of computer program source code;
   an act of recognizing a statement requesting to await the completion of an asynchronous operation, the statement included in the asynchronous method;
   in response to recognizing the statement, an act of transforming the statement into a plurality of other statements, the plurality of other statements configured to use an awaitable object to await completion of the asynchronous operation, the plurality of other statements configured to:
      use a first member of the awaitable object to determine a completion status of the asynchronous operation;
      use a second member of the awaitable object to await completion of the asynchronous operation when the completion status indicates that the asynchronous operation has not already completed, the second member configured to await completion of the asynchronous operation and to resume execution of the asynchronous method at a resumption point in the asynchronous method when the asynchronous operation completes;
      return to a calling context after awaiting completion of the asynchronous operation;
      resume execution of the asynchronous method at the resumption point subsequent to completion of the asynchronous operation; and
      use a third member of the awaitable object to access a result of the asynchronous operation subsequent to resuming execution of the asynchronous method.

2. The method of claim 1, wherein the awaitable object exposes a single method that calls the first member and the second member, the plurality of other statements being configured to use the single method, instead of using the first member and the second member directly.

3. The method of claim 2, wherein the plurality of other statements are also configured to initialize state data, including state data for the resumption point, prior to calling the single method.

4. The method of claim 1, wherein the plurality of other statements are also configured to initialize state data, including state data for the resumption point, after completion status indicates that the asynchronous operation has not already completed and prior to using the second member of the awaitable object to await completion of the asynchronous operation.

5. The method of claim 1, wherein the plurality of other statements are also configured to report to the calling context that the asynchronous operation has completed when completion status indicates that the asynchronous operation has already completed, and to refrain from use of the second member.

6. The method of claim 1, wherein the plurality of other statements are also configured to obtain the awaitable object by instantiating an instance of the awaitable object.

7. The method of claim 1, wherein the result of the asynchronous operation comprises a result of the asynchronous operation running to completion.

8. The method of claim 1, wherein the result of the asynchronous operation comprises exception data of the asynchronous operation completing exceptionally.

9. The method of claim 1, wherein the result of the asynchronous operation comprises a stored token indicating the source of a cancellation request resulting in the cancellation of the asynchronous operation.

10. The method of claim 1, wherein the awaitable object is a composable object usable for use along with all programming language supported constructs.

11. The method of claim 1, wherein the awaitable object is a future object, representing one or more future states of the asynchronous operation running to completion, the one or more future states including one or more of: successful completion, exceptional completion, or completion due to cancellation.

12. A computer program product for use at a computer system, the computer program product for implementing a method for transforming source code to await execution of asynchronous operations, the computer program product comprising one or more computer storage media having stored thereon computer-executable instructions that, when executed at a processor, cause the computer system to perform the method, including the following:
   access an asynchronous method from within a portion of computer program source code;
   recognize a statement requesting to await the completion of an asynchronous operation, the statement included in the asynchronous method;
   in response to recognizing the statement, transform the statement into a plurality of other statements, the plurality of other statements configured to use an awaitable object to await completion of the asynchronous operation, the plurality of other statements configured to:
      use a first member of the awaitable object to determine a completion status of the asynchronous operation;
      use a second member of the awaitable object to await completion of the asynchronous operation when the completion status indicates that the asynchronous operation has not already completed, the second member configured to await completion of the asynchronous operation and to resume execution of the asynchronous method at a resumption point in the asynchronous method when the asynchronous operation completes;

return to a calling context after awaiting completion of the asynchronous operation;

resume execution of the asynchronous method at the resumption point subsequent to completion of the asynchronous operation; and use a third member of the awaitable object to access a result of the asynchronous operation subsequent to resuming execution of the asynchronous method.

13. The computer program product as recited in claim 12, wherein the awaitable object exposes a single method that calls the first member and the second member, the plurality of other statements being configured to use the single method, instead of using the first member and the second member directly.

14. The computer program product as recited in claim 13, wherein the plurality of other statements are also configured to initialize state data, including state data for the resumption point, prior to calling the single method.

15. The computer program product as recited in claim 12, wherein the plurality of other statements are also configured to initialize state data, including state data for the resumption point, after completion status indicates that the asynchronous operation has not already completed and prior to using the second member of the awaitable object to await completion of the asynchronous operation.

16. The computer program product as recited in claim 12, wherein the plurality of other statements are also configured to report to the calling context that the asynchronous operation has completed when completion status indicates that the asynchronous operation has already completed, and to refrain from use of the second member.

17. The computer program product as recited in claim 12, wherein the plurality of other statements are also configured to obtain the awaitable object by instantiating an instance of the awaitable object.

18. At a computer system including one or more processors and system memory, the computer system also including one or more modules for converting source code into executable code, a method for transforming source code to await execution of asynchronous operations, the method comprising:

an act of accessing an asynchronous method from within a portion of computer program source code;

an act of recognizing a statement requesting to await the completion of an asynchronous operation, the statement included in the asynchronous method;

in response to recognizing the statement, an act of transforming the statement into a plurality of other statements, the plurality of other statements configured to use an awaitable object to await completion of the asynchronous operation, the plurality of other statements configured to:

use a first member of the awaitable object to determine a completion status of the asynchronous operation, the completion status selected from among already completed and not yet completed;

generate state information when the completion status indicates that the asynchronous operation has not yet completed, the state information including establishing a resumption point in the asynchronous method;

use a second member of the awaitable object to await completion of the asynchronous operation when the completion status indicates that the asynchronous operation has not yet completed, the second member configured to await completion of the asynchronous operation and to resume execution of the asynchronous method at the resumption point when the asynchronous operation completes;

return to a calling context after awaiting completion of the asynchronous operation;

resume execution of the asynchronous method at the resumption point subsequent to completion of the asynchronous operation; and use a third member of the awaitable object to access a result of the asynchronous operation subsequent to resuming execution of the asynchronous method.

19. The method of claim 18, wherein the plurality of other statements are also configured to report to the calling context that the asynchronous operation has completed when completion status indicates that the asynchronous operation has already completed, and to refrain from generating state information and using second member.

20. The method of claim 18, wherein the awaitable object is a future object, representing one or more future states of the asynchronous operation running to completion, the one or more future states including one or more of: successful completion, exceptional completion, or completion due to cancellation.

* * * * *